US006973079B1

United States Patent
Carlson et al.

(10) Patent No.: US 6,973,079 B1
(45) Date of Patent: *Dec. 6, 2005

(54) APPARATUS AND METHOD FOR SCALING A SWITCHING FABRIC IN A NETWORK SWITCHING NODE

(75) Inventors: James D. Carlson, North Andover, MA (US); Steven J. Schwartz, Sudbury, MA (US); Eric J. Spada, Lexington, MA (US); Eric J. Pelletier, Lexington, MA (US); Jeffrey A. Koehler, Westborough, MA (US)

(73) Assignee: Pluris, Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/400,927

(22) Filed: Sep. 22, 1999

Related U.S. Application Data

(63) Continuation of application No. 09/333,218, filed on Jun. 15, 1999.

(51) Int. Cl.[7] .......................... H04L 12/50; H04L 12/28
(52) U.S. Cl. .................................. 370/367; 370/395.71
(58) Field of Search ........................ 370/252, 367–386, 370/389, 365, 395.71, 352, 353, 354, 355, 360, 356, 387, 388, 235, 236, 380; 379/272, 273

(56) References Cited

U.S. PATENT DOCUMENTS

| 4,706,081 | A | * | 11/1987 | Hart et al. |
| 5,189,665 | A | * | 2/1993 | Niehaus et al. |
| 5,528,584 | A | * | 6/1996 | Grant et al. |
| 5,703,879 | A | * | 12/1997 | Proctor et al. |
| 5,781,537 | A | * | 7/1998 | Ramaswami et al. |
| 5,805,614 | A | * | 9/1998 | Norris |
| 5,821,875 | A | * | 10/1998 | Lee et al. |
| 5,878,025 | A | | 3/1999 | Tomonaga .................. 370/219 |
| 5,999,528 | A | * | 12/1999 | Chow et al. ................ 370/365 |
| 6,434,115 | B1 | * | 8/2002 | Schwartz et al. |

FOREIGN PATENT DOCUMENTS

| EP | 0 734 188 A2 | 9/1996 | ..................... 3/68 |

OTHER PUBLICATIONS

International Search Report.

* cited by examiner

*Primary Examiner*—Afsar Qureshi
(74) *Attorney, Agent, or Firm*—Donald R. Boys; Central Coast Patent Agency, Inc.

(57) ABSTRACT

A method and apparatus for reallocating switching circuitry in a switching fabric are disclosed. The switching fabric is used to permit data transfer among a plurality of interface units each having a plurality of data ports. The switching fabric is partitionable into a plurality of switch planes such that each switch plane can be assigned to transfer data associated with like data ports of the interface units. Each switch plane includes multiple switching channels each assignable to transfer data associated with one data port of one of the interface units, in a full implementation. The number of interface units is less than the number of switching channels in a switch plane, then the reallocation is performed such that multiple channels of at least one switch plane can be assigned to transfer data of multiple ports of at least one of the interface units. This results in switch plane channels that would otherwise be unused being utilized to transfer data. This reallocation of switch plane channels can result in the elimination of one or more switch planes from the switch fabric resulting in substantially reduced hardware complexity and cost.

13 Claims, 14 Drawing Sheets

| IU1 | | | IU2 | |
|---|---|---|---|---|
| Port 1 Table | | | Port 1 Table | |
| IU | Channel | | IU | Channel |
| 1 | 1 | | 1 | 1 |
| 2 | 2 | | 2 | 2 |
| 3 | 3 | | 3 | 3 |
| 4 | 4 | | 4 | 4 |
| Port 2 Table | | | Port 2 Table | |
| IU | Channel | | IU | Channel |
| 1 | 1 | | 1 | 1 |
| 2 | 2 | | 2 | 2 |
| 3 | 3 | | 3 | 3 |
| 4 | 4 | | 4 | 4 |
| Port 3 Table | | | Port 3 Table | |
| IU | Channel | | IU | Channel |
| 1 | 1 | | 1 | 1 |
| 2 | 2 | | 2 | 2 |
| 3 | 3 | | 3 | 3 |
| 4 | 4 | | 4 | 4 |
| Port 4 Table | | | Port 4 Table | |
| IU | Channel | | IU | Channel |
| 1 | 1 | | 1 | 1 |
| 2 | 2 | | 2 | 2 |
| 3 | 3 | | 3 | 3 |
| 4 | 4 | | 4 | 4 |

*Fig. 6*

| IU1 Port 1 Table | |
|---|---|
| IU | Channel |
| 1 | 1 |
| 2 | 2 |
| 3 | x |
| 4 | x |

| IU2 Port 1 Table | |
|---|---|
| IU | Channel |
| 1 | 1 |
| 2 | 2 |
| 3 | x |
| 4 | x |

| IU1 Port 2 Table | |
|---|---|
| IU | Channel |
| 1 | 1 |
| 2 | 2 |
| 3 | x |
| 4 | x |

| IU2 Port 2 Table | |
|---|---|
| IU | Channel |
| 1 | 1 |
| 2 | 2 |
| 3 | x |
| 4 | x |

| IU1 Port 3 Table | |
|---|---|
| IU | Channel |
| 1 | 3 |
| 2 | 4 |
| 3 | x |
| 4 | x |

| IU2 Port 3 Table | |
|---|---|
| IU | Channel |
| 1 | 3 |
| 2 | 4 |
| 3 | x |
| 4 | x |

| IU1 Port 4 Table | |
|---|---|
| IU | Channel |
| 1 | 3 |
| 2 | 4 |
| 3 | x |
| 4 | x |

| IU2 Port 4 Table | |
|---|---|
| IU | Channel |
| 1 | 3 |
| 2 | 4 |
| 3 | x |
| 4 | x |

*Fig. 9*

Fig. 6-2:1 Folded Fabric with Five Slices

Fig. 7-2:1 Folded Fabric with Six Slices

APPARATUS AND METHOD FOR SCALING A SWITCHING FABRIC IN A NETWORK SWITCHING NODE

RELATED APPLICATIONS

This application is a continuation of U.S. application Ser. No. 09/333,218, filed on Jun. 15, 1999, the contents of which are incorporated herein in their entirety by reference.

BACKGROUND OF THE INVENTION

In many complex systems such as digital communications systems, switching systems or "switching fabrics" are employed to route data between system modules. For example, in a network node on a digital network, a switching fabric can be used to route data packets between ports on the node, each of which, in a general bidirectional system, can serve as both an input port and an output port. The switching nature of the fabric refers to its ability to controllably route individual data packets from one of many data ports to another of the data ports.

Some switching fabrics are implemented as multiple switch "planes" or "slices", each of which handles a portion of the total switching capability of the fabric. The switch planes are allocated in a configuration which in general permits each port to transfer data to all of the ports, including through the switching fabric back to itself. Consequently, switch planes can be extremely complex pieces hardware which can be very expensive to implement. It would therefore be beneficial to reduce the number of planes required to implement the switching fabric.

SUMMARY OF THE INVENTION

The present invention provides a method and apparatus which reduces the number of switch planes required to implement a switch fabric by altering how the switch planes and data ports are allocated. The system of the invention is applicable in a system such as a network switching node in which data are transferred among a plurality of interface units, each having a plurality of data ports, connected across a switching fabric of node switching circuitry. The fabric is partitionable into a plurality of switch planes such that each switch plane is assignable to transfer data associated with a like data port of the plurality of interface units. Each switch plane includes multiple switching channels each assignable to transfer data associated with one data port on one of the interface units. In accordance with the invention, a number of interface units connected to the switch fabric is determined. If the number of interface units is less than the number of switching channels in each switch plane, then, for at least one of the switch planes, a first channel of the switch plane is assigned to transfer data associated with a first data port of a first interface unit and a second channel in the at least one switch plane is assigned to transfer data associated with a second port of the first interface unit.

Thus, in accordance with the invention, when a full implementation of one switch plane for each like port of all of the interface units results in unused channels in the switch planes because there are more channels in each plane than there are interface units connected to the switch fabric, then the switch channels can be reallocated among the data ports of the interface units such that each switch plane can include channels assigned to more than one port of one or more interface units. The reallocation of the invention results in channels of switch planes that would have been unused in a full implementation being used to transfer data. In one embodiment, as a result of the reallocation, one or more switch planes can have no channels assigned to transfer data, such that one or more switch planes can be eliminated from the switch fabric, resulting in substantially reduced fabric hardware cost and complexity.

In one embodiment of the invention, the assignment of ports to channels and/or switch planes is accomplished via an allocation table stored in a memory. Each port is assigned its own unique allocation table. The table for a port defines an association between a destination interface unit, i.e., an interface unit to which a data packet is being transferred, and a channel of the switch plane with which the port is associated. That is, each data packet to be routed across the switch fabric includes information identifying the interface unit to which the packet is to be transferred. The port transferring the packet uses its allocation table to identify the channel in its switch plane through which the data packet should be routed to reach its destination interface unit.

In one embodiment of the invention, the reallocation of the switching circuitry involves creating a new allocation table for one or more ports in one or more interface units. The allocation table is altered to create a new association between destination interface units and switch plane channels such that data can be routed from the port to the destination interface unit connected to the new switch plane channel identified by the reallocation. In addition to this regeneration of an altered allocation table, physical connections, e.g., by optical fiber, are rerouted to ensure that ports are connected to switch plane channels according to the reallocation.

The reallocation method and apparatus of the invention provide a scalable switching fabric. The scaling can be performed as described above to reduce the size and hardware complexity and, therefore, the cost of the switching fabric in cases where fewer interface units are used than would be used in a full implementation. Likewise, the reallocation can be reversed such that the switching fabric can be scaled back to a larger size in the event that it is desired to add interface units to the fabric. Therefore, the reallocation of the invention provides for a flexible scalable switching fabric which can be sized up and down depending upon changing system requirements.

In one embodiment of the invention, the reallocation incorporates a systematic symmetric reassignment of channels and ports. This symmetric reassignment can be referred to as a symmetric "folding" of the switch fabric. Using this fabric folding approach to reallocating switching channels, a logically ordered reallocation is achieved. For example, one "fold" of the fabric can result in an implementation that requires half of the switch planes that would be required for a full implementation.

In one embodiment, a full implementation of the switching circuitry includes as many switch planes as there are ports in each interface unit. That is, if each interface unit includes M ports, then the switching fabric is implemented using M switch planes. Each switch plane includes as many channels as there are interface units. That is, if N interface units are connected to the switch fabric, then each switch plane includes N channels. Each interface unit includes one connection to each of the switch planes, and each switch plane contains one connection to each interface unit via each of its channels. In one particular implementation, like ports of all of the interface units are connected to a single switch plane. That is, for example, Port 1 of all of the interface units is connected to switch Plane 1, Port 2 of all of the interface units is connected to switch Plane 2, etc., and port M of all of the interface units is connected to switch Plane M. Hence, there are as many switch planes as there are ports in each interface unit and there are as many channels in each switch plane as there are interface units. In one particular embodiment, the switch fabric is capable of connecting to sixteen interface units, i.e., N=16; and each interface unit includes 12 ports, i.e., M=12.

When fewer than the full N interface units are implemented, fewer than N switch channels are used on each switch plane. In accordance with the invention, the switch planes are reallocated such that ports of the interface units that are implemented are assigned to channels on switch planes that they would not have been assigned to if a full implementation were used. For example, where only eight interface units are used in a system in which a full implementation includes 16 interface units of 12 ports each, two ports from the interface units can be routed to two channels on a single switch plane, instead of only one port being routed to each switch plane. In this way, the otherwise unused channels on each of the planes are used, and the remaining completely unused switch planes need not be implemented. In this example, six switch planes can be omitted and the remaining six switch planes, each having sixteen switch channels, can be connected to two ports of each interface unit. Hence, by scaling or "folding" the switch fabric, the number of switch planes that must be implemented can be reduced, in this case, by half.

Hence, the switch reallocation apparatus and method of the invention provides a means for substantially reducing the amount of hardware required to implement a switch fabric in a switching node in which the full data switching capability of the node is not implemented, either on a temporary or permanent basis. By reallocating the port connections to the switch fabric, the number of switch planes that must be implemented can be substantially reduced, leading to reduced hardware complexity and cost. The invention also provides the capability of scaling or "unfolding" the switch fabric back up to a larger implementation to accommodate expansion of the system by addition of new interface units.

The apparatus and method of the invention used to implement data switching circuitry is applicable in various systems such as networks in which data are transferred. For example, the invention can be implemented in a switching node of the type described in copending U.S. patent application Ser. No. 09/108,771, filed on Jul. 2, 1998, entitled "System and Method for Switching Packets in a Network," by Schwartz, et al., and assigned to the same assignee as the present application. The contents of that application are incorporated herein in their entirety by reference.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 6 contains port allocation tables for the system of FIG. 5.

FIG. 9 contains port allocation tables for the reallocated switch fabric of FIG. 8.

DETAILED DESCRIPTION OF PREFERRED EMBODIMENTS

Figure 1:
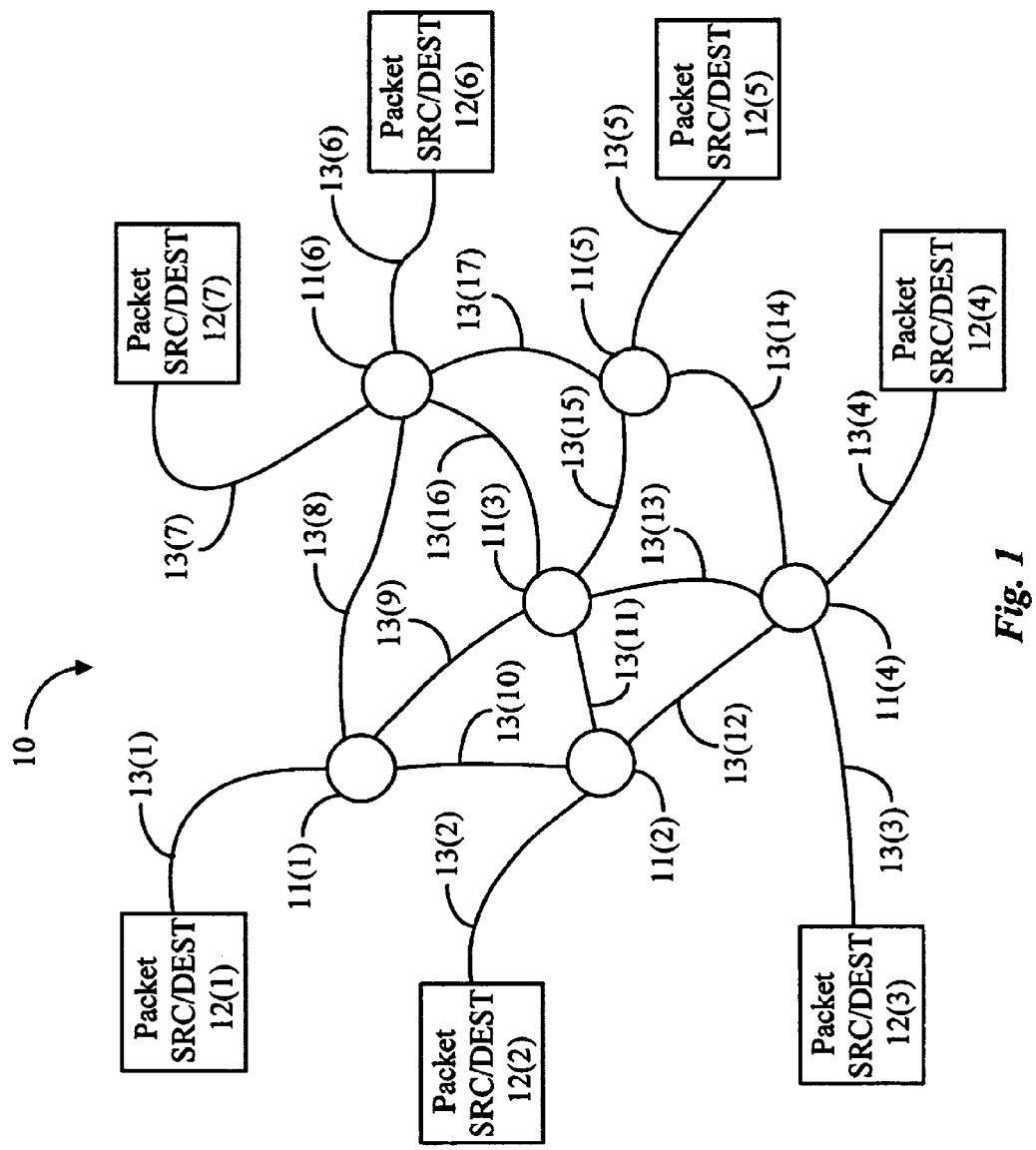
FIG. 1 is a schematic block diagram of a network that includes at least one switching node which incorporates the switching circuitry scaling apparatus and method of the invention.

FIG. 1 schematically depicts a computer network 10 in which the invention can be applied. The network 10 includes a plurality of switching nodes 11(1) through 11(N), generally identified by reference numeral 11, for transferring signals representing data among a number of devices, which in FIG. 1 are represented by packet source/destination devices 12(1) through 12(M), generally identified by reference numeral 12, in a wide area network ("WAN"). The packet source/destination devices 12 can include a particular device such as a computer system or other device that stores, generates, processes or otherwise uses digital data. It can also be a local area network of such devices Each packet source/destination device 12 is connected over a communication link, generally identified by reference numeral 13, to a switching node 11 to facilitate transmission of data thereto or the reception of data therefrom.

The switching nodes 11 are interconnected by communication links, also generally identified by reference numeral 13, to facilitate the transfer of information among the respective switching nodes 11. The communication links 13 may utilize any convenient information transmission medium, including, for example, wires for carrying electrical signals, optical fiber links for carrying optical signals, and so forth. Each communication link 13 is preferably bidirectional, allowing the switching nodes 11 to transmit and receive signals among each other and with customer premises equipment 12 connected thereto over the same link. Depending on the particular type of medium selected for respective communication links 13, multiple media may be provided for transferring signals in opposite directions thereby to provide the bidirectional link.

Data are transferred in the network 10 in the form of packets. Generally, a packet includes a header portion and a data portion. The header portion includes information that assists in routing the packet through the network, with the specific information depending on the particular packet routing protocol that is used in routing packets through the network. In connection with network 10, any of a number of well-known packet routing protocols may be used; in one embodiment, the well-known Internet protocol ("IP") is used. In any case, the header typically includes address information including a source address identifying the particular source device 12($m_S$) that generated the packet and a destination address identifying the particular destination address 12($m_D$) that is to receive the packet. In the IP protocol, a packet may be of variable length, and the header typically will also include length information to identify the length of the packet. The header also typically includes other information, including, for example, protocol identifier information that identifies the particular protocol that defines the structure of the packet. The data portion contains the data payload of the packet. The packet may also include, as part of the data portion or otherwise, error detection information that can be used to determine whether an error occurred in transferring the packet.

A source device 12($m_S$), after generating a packet for transfer to a destination device 12($m_D$), will provide the packet to the switching node 11 to which it is connected. The switching node 11 uses the destination address in the packet to attempt to identify a route over which it is to transfer the packet to forward the packet to either the destination device 12($m_D$), if the switching node 11(n) is connected to the destination device 12 ($m_D$), or to another switching node 11(n) (n'≠n) along a path to the destination device 12($m_D$). The route associates a destination address with one of the communication links 13 connected to the switching node. If the switching node can identify a route for the received packet, it will forward the packet over the communication link identified by the route. Each switching node 11(n), 11(n'), . . . , that receives the packet will perform a similar operation. If all of the switching nodes have respective routes for the destination address, the packet will eventually arrive at the destination device 12($m_D$).

Figure 2:
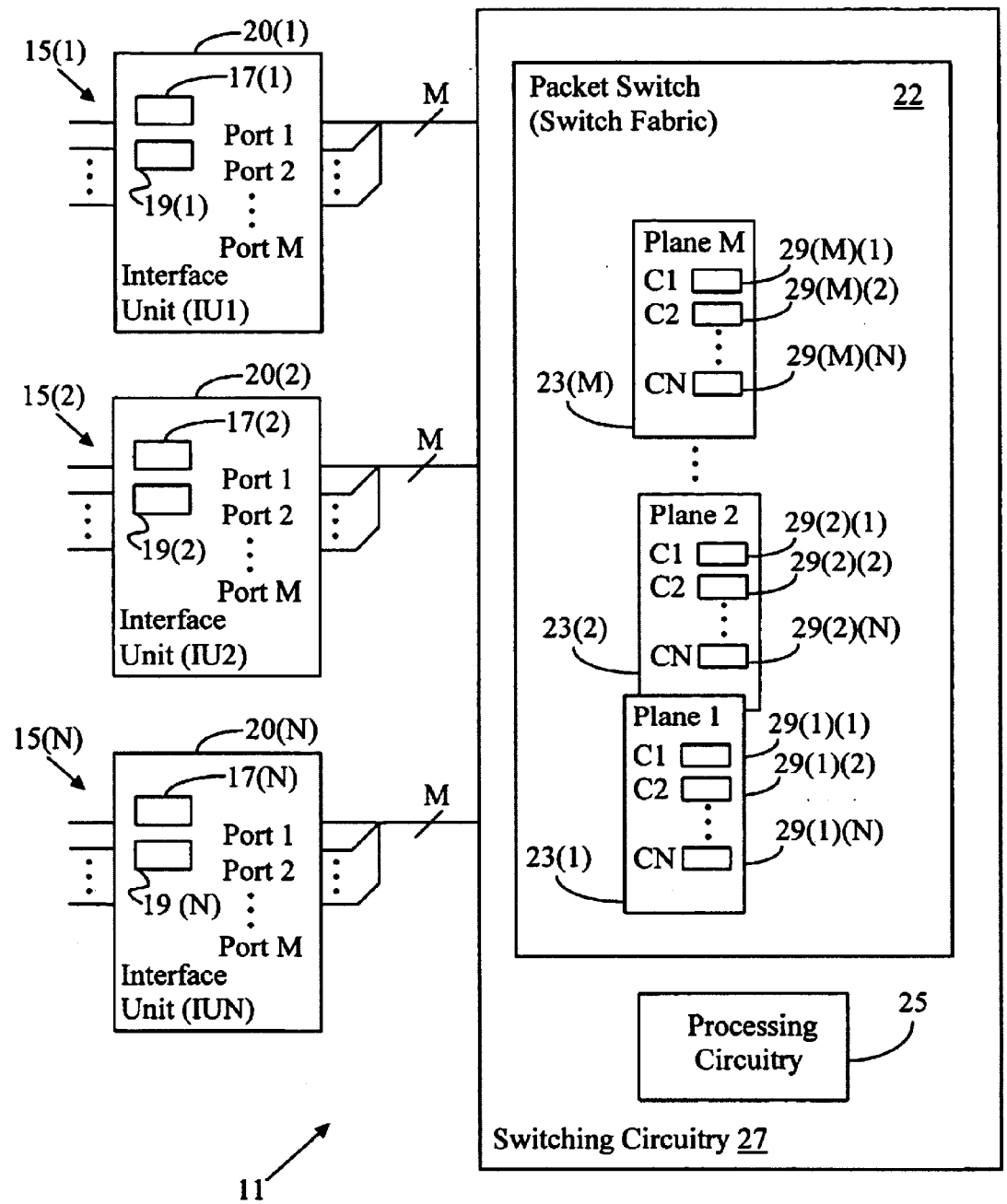
FIG. 2 is a schematic functional block diagram of a switching node in the network of FIG. 1 which incorporates the switching circuitry scaling apparatus and method of the invention.

FIG. 2 contains a functional block diagram of one embodiment of a switching node 11 which uses the switch fabric scaling or "folding" apparatus and method of the invention. The switching node 11 includes N interface units 20(1), 20(2) . . . , 20(N), labeled IU1, IU2, . . . , IUN, respectively, connected to switching circuitry 27. Each interface unit 20 includes multiple ports 15(1), 15(2), . . . , 15(N) for connecting the interface units to the network communication links 13. In general, data can be received from and transferred to the network into and out of the interface units 20 via the ports 15. Each interface unit 20 also includes M ports which are connected to switching circuitry 27. Data being transferred between interface units 20 are forwarded out of one of the ports, i.e., Port 1, Port 2, . . . , Port M, of one of the interface units 20 to the switching circuitry 27, where the data are routed according to a predefined destination to one of the interface units 20 for transfer onto the network. Each of the connections between the ports and the switching circuitry 27 is bidirectional such that data can be forwarded in and out of the interface units 20 via the lines connected to the ports. Also, data can be transferred out of one of the interface units 20, through the switching circuitry 27, and back out through the same interface unit 20.

The switching circuitry 27 includes a packet switch or "switch fabric" 22 which routes data packets between the interface units 20. The switching circuitry 27 also includes processing circuitry 25 which oversees and controls the routing of data packets through the switch fabric 22. In one embodiment, the packet switch 22 is in the form of a crosspoint switch. More specifically, the switch fabric 22 is implemented in the form of a plurality of switch planes, in one embodiment, M switch planes, 23(1), 23(2), . . . , 23(M), each of which is the form of a crosspoint switch. Providing multiple switch planes 23 in the packet switch 22 allows for more rapid switching of packets through the switch fabric, allowing for higher throughput of packets between the interface units 20. In addition, if one of the switch planes 23 fails or otherwise malfunctions, it can be removed from the system or bypassed by a parallel plane 23. Further details of the hardware implementation of the switch plane are described in copending U.S. applications Ser. No. 09/108, 771, filed on Jul. 2, 1998, incorporated herein by reference.

In general, in a fully implemented system, the packet switch 22 includes as many switch planes 23 as there are ports in each interface unit 20 connected to the switch fabric 22. In the illustration of FIG. 2 there are M ports in each interface unit 20 and, accordingly, the switch fabric 22 is implemented with M switch planes 23. In this full implementation, each switch plane 23 includes N switching channels 29, labeled CH1, CH2, . . . , CHN, connected to the ports for routing data between the ports. Within a single switch plane 23, each channel CH1, CH2, . . . , CHN, is connected to one port from each of the N interface units 20. In one particular full implementation, like ports of all of the interface units 20 are connected to a single plane 23. That is, for example, all of the Port 1s from all of the interface units 20 are connected to a single switch plane, e.g., Plane 1. Likewise, all of the N Port 2s can be connected to the N channels, CH1, CH2, . . . CHN, of Plane 2. Since there are N interface units 20 and N channels CH1, CH2, . . . , CHN, in the plane 23(1), the full implementation is achieved when all of the ports from all of the interface units are connected to all of the channels of all of the planes.

As a result of this full implementation connection, within each plane, all interface units 20 can communicate bidirectionally with all of the interface units 20 within each of the individual planes 23. For example, if a data packet is received at IU2 for transmission to IU8, one of the ports of IU2 is selected for transmission of the packet. If, for example, the selected port is Port 2, the packet is routed into Channel 2 of Plane 2 and out of Channel 8. Channel 8 of Plane 2 is connected to Port 2 of IU8. Therefore, the packet is routed out of Plane 2 through Channel 8 back to Port 2 of IU8.

To implement the proper routing of packets, each interface unit 20(1), 20(2), . . . , 20(N) includes processing circuitry 17(1), 17(2), . . . , 17(N), respectively. An allocation table or remap table is stored in a memory 19(1), 19(2), . . . , 19(N) in each interface unit 20(1), 20(2), . . . , 20(N). Each port is assigned its own allocation table. Each allocation table stored in the memory 19 associates its port with a switch channel 29 through which packets should be routed to reach the designated destination interface unit. Therefore, for each interface unit 20, M allocation tables are stored in the memory 19. The allocation table defines a relationship between the associated port and the switch channel that is to be used to route data to the destination interface unit. Hence, for a full implementation as shown in FIG. 2, the memory 19 in each interface unit 20 stores M allocation tables, one for each port. Within each allocation table, there are N entries for each possible destination interface unit. For example, the allocation table for Port 2 of IU2 includes a relationship between each destination interface unit and Port 2 of IU2. For example, in that table, the entry for IU7 would be channel 7 (C7), since data packets transferred via Port 2 to switch Plane 2 will enter the plane through Channel 2 and exit the plane through Channel 7. Each packet will accordingly be routed via Channel 7 out to Port 2 of IU7.

When a data packet being transferred by an interface unit 20 is formatted for transfer across the switch fabric 22, the associated processor 17 selects a port for the transfer and then reads the associated allocation table stored in the memory 19 to determine the channel for routing the data to the destination interface unit. That channel information is attached or apended to the data packet being transferred such that the switch plane 23 can properly route the data packet to the appropriate channel.

In many instances, fewer than the maximum N interface units 20 will be implemented. As a result, in each switch plane, fewer than the N total channels are utilized. This results in wasted expensive hardware being implemented in a system. In accordance with the present invention, connections between ports of the interface units that are actually implemented are formatted to use channels of switch planes that are available and would otherwise go unused because fewer than the maximum M interface units are implemented. In the present invention, this reallocation includes regenerating the allocation or remap tables for the ports in the interface units that are implemented and connecting the interface units to the appropriate channels of the switch planes. As a result, by properly selecting the allocation of channels, switch planes can be eliminated from the implementation, resulting in substantial cost savings.

The reallocation of the switching circuitry of the invention will now be described in detail with reference to FIGS. 3–9. For clarity and ease of description, the invention is described in terms of a system whose full implementation configuration includes four switch planes each having four channels and being connected to four interface units, each having four ports. It will be understood that the details of the invention described in connection with this illustrative exemplary embodiment are applicable to systems having full implementations including any number of interface units, ports, switch planes and switch plane channels. In particular, the invention is applicable to the specific embodiment in which the full implementation includes 12 switch planes of 16 channels each and 16 interface units, each of which has 12 ports.

Figure 3:
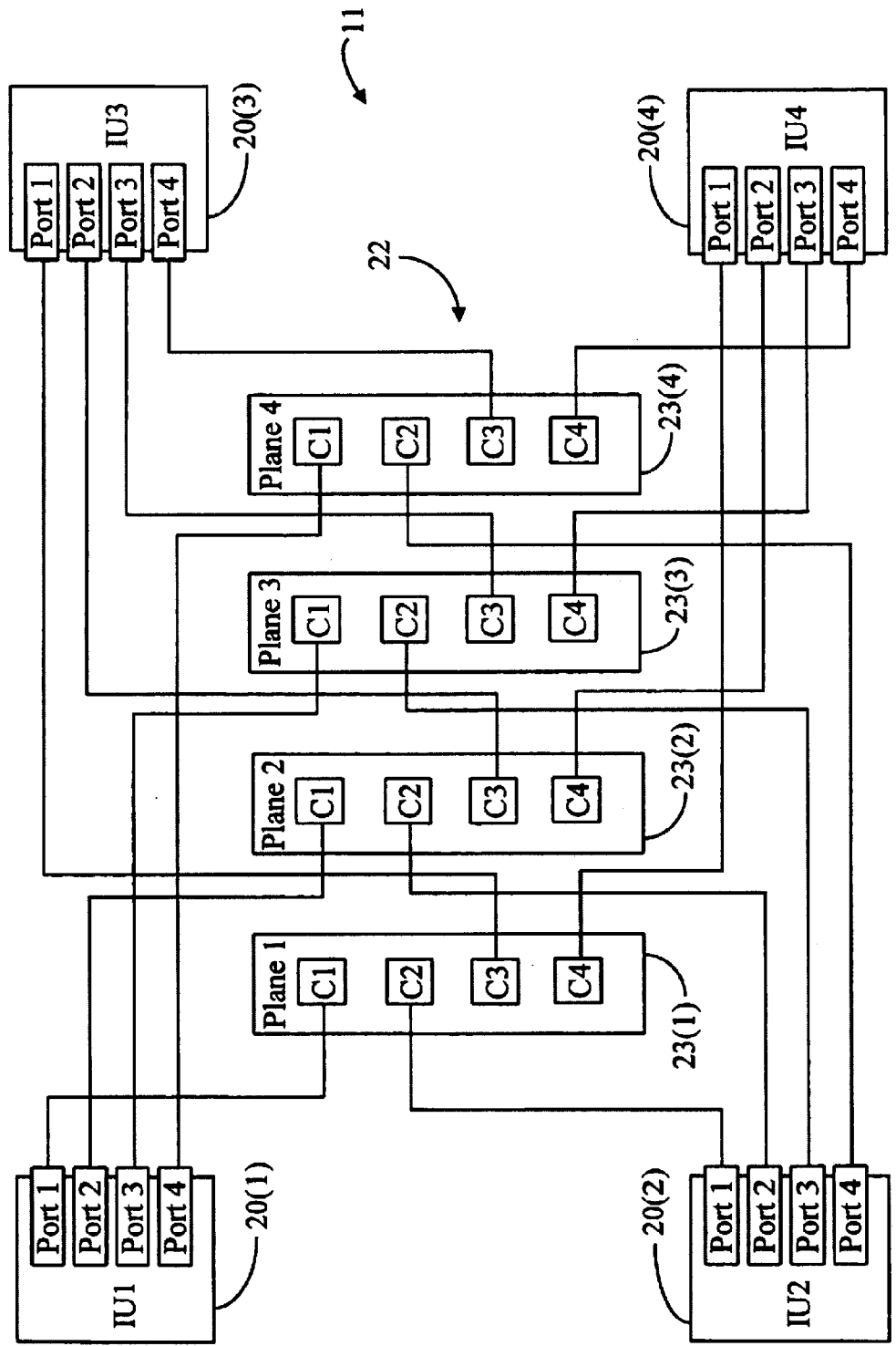
FIG. 3 is a schematic block diagram of a switching node in a full implementation connection of four interface units across a switching fabric having four switch planes of four switching channels each.

FIG. 3 is a schematic block diagram of a portion of a switching node 11 showing a full implementation configuration in which four interface units 20(1), . . . , 20(4) each having four ports are connected to a switch fabric 22 which includes four switch planes 23(1), . . . , 23(4), each of which includes four switching channels C1, . . . , C4. As shown in FIG. 3, each of the interface units 20 is associated with a channel of the switch planes 23. That is, IU1 is associated with Channel 1 of all of the switch planes, IU2 is associated with Channel 2 of all of the switch planes, IU3 is associated with Channel 3 of all of the switch planes, and IU4 is associated with Channel 4 of all of the switch planes. Likewise, like ports of all of the interface units are associated with one of the switch planes. That is, Port 1 of all four interface units 20 is connected to Plane 1, Port 2 of all four interface units 20 is connected to Plane 2, Port 3 of all four interface units 20 is connected to Plane 3, and Port 4 of all four interface units 20 is connected to Plane 4. Using this connection scheme, each port of all of the interface units can communicate with a port of all of the interface units. Therefore, fill bandwidth communication among the interface units is implemented.

Figure 4:
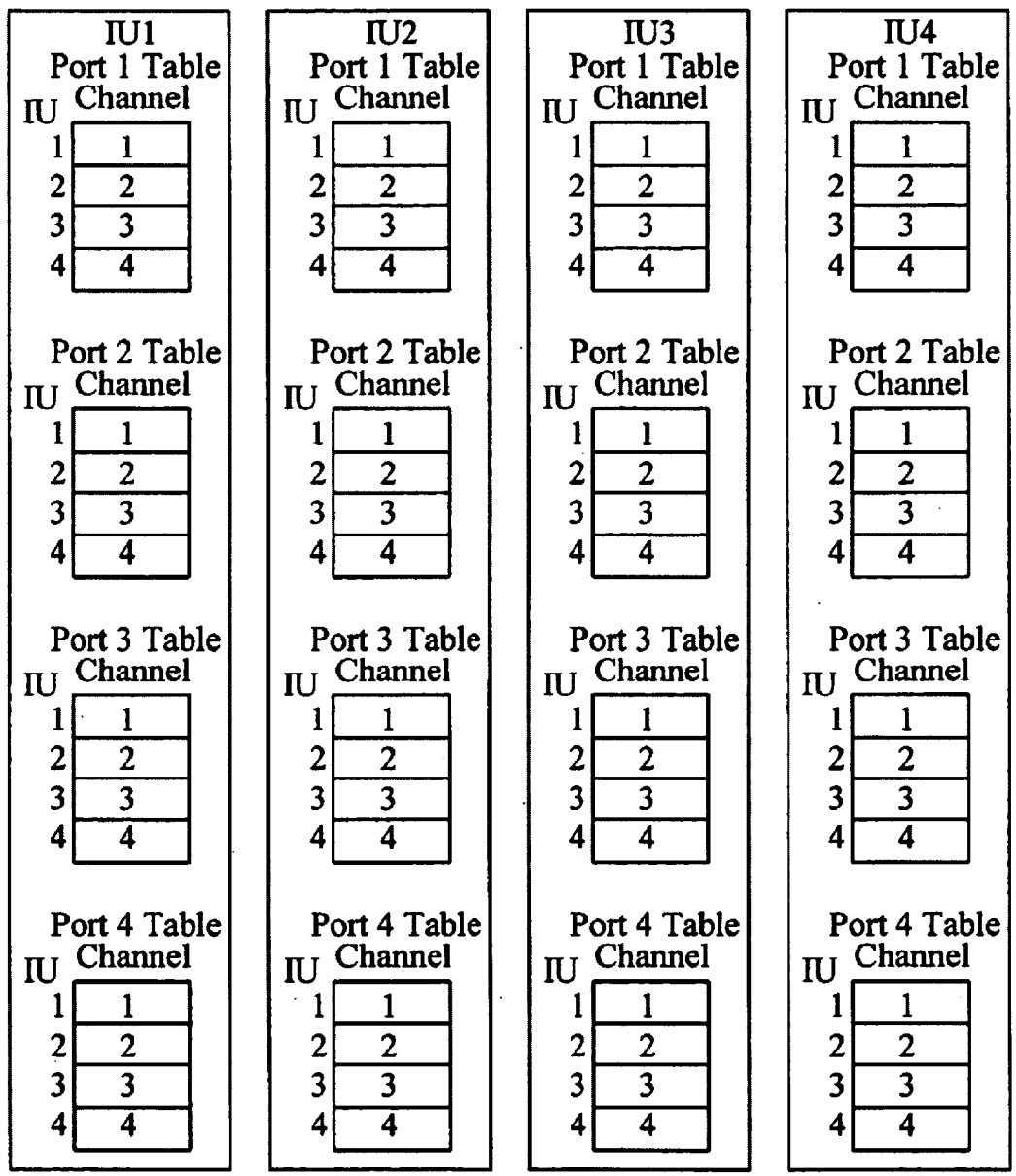
FIG. 4 contains port allocation tables for the interface unit ports in the system of FIG. 3.

FIG. 4 contains allocation tables for each of the four ports on each of the four interface units shown in FIG. 3. Each allocation table defines a channel of a switch plane through which a data packet or message routed through a particular port should be forwarded to reach the destination interface unit. That is, for each port, the associated allocation table defines the channel of the port's associated switch plane through which data packet should be routed to reach a particular interface unit. For example, the IU1 Port 2 table shows that data packets being forwarded to IU2 should be routed through Channel 2 of the switch plane. Data packets being routed to IU3 should be routed through Channel 3, data packets being routed to IU4 should be routed through Channel 4, and packets being routed back to IU1 should be forwarded through Channel 1.

When a packet is to be transferred, it arrives at a distribution function block of the sending interface unit addressed to a particular destination interface unit. The distribution block selects one of the ports of the sending interface unit through which the packet is to be transferred. The processing circuitry accesses the memory associated with that port to read its allocation table. The destination IU number associated with the packet is replaced with the channel number read from the allocation table for the destination interface unit. The message is then transferred out of the selected port of the sending interface unit toward the switch plane 23 of the switch fabric 22 associated with the sending port. The packet is routed through the plane 23 to the selected channel and then to the selected destination interface unit via the port connected to the channel 29.

Figure 5:
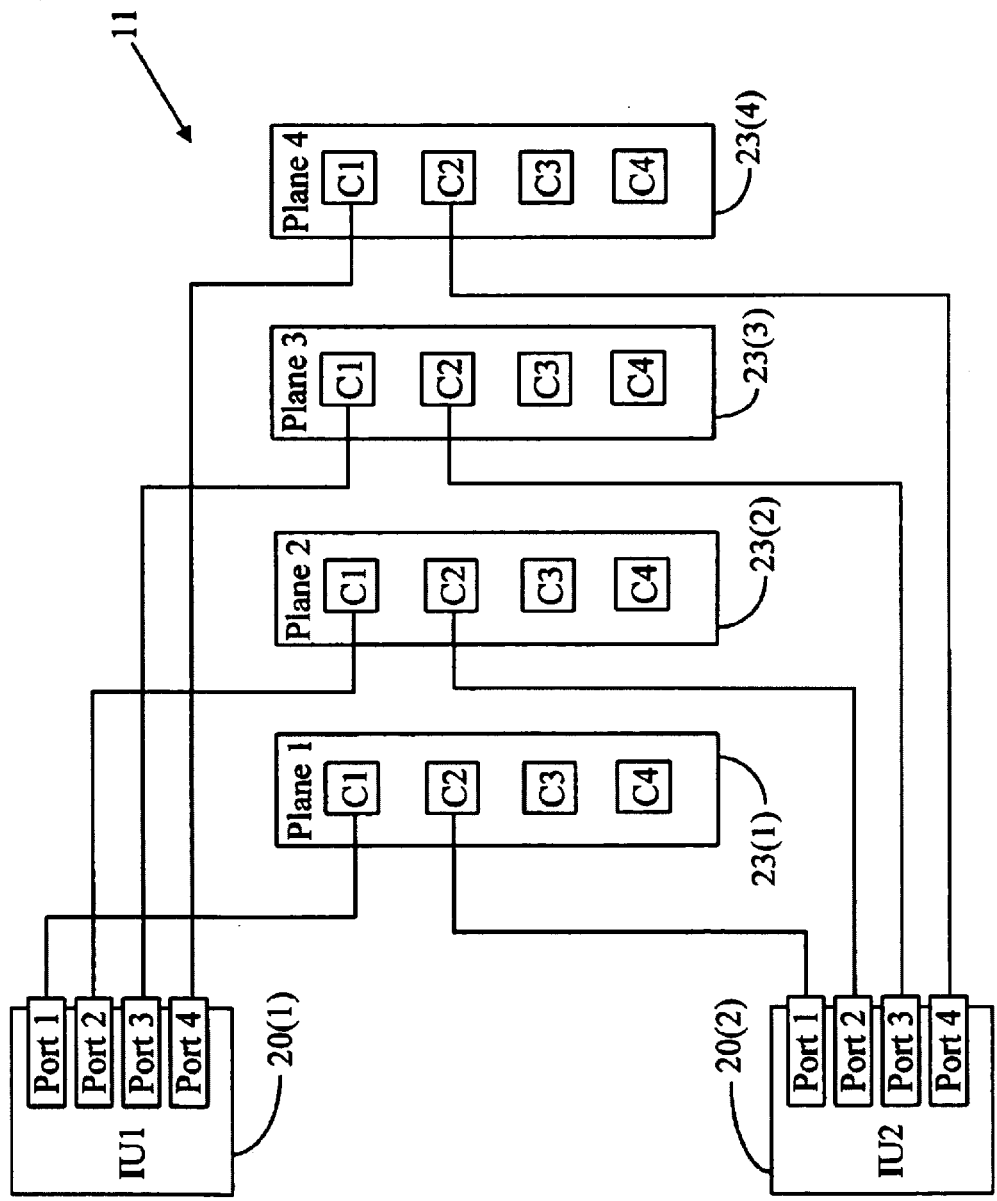
FIG. 5 is a schematic block diagram of the system of FIG. 3 using two interface units instead of four.

FIG. 5 is a schematic block diagram which illustrates the system of FIG. 3 in which only two interface units 20(1), 20(2) are implemented instead of the four interface units shown in the full implementation of FIG. 3. As shown in FIG. 5, with two interface units implemented, two channels 29 on each of the switch planes 23 are unused. Therefore, in this implementation, one half of the implemented hardware is wasted. In accordance with the invention, the assignment of switch planes to IU ports is reallocated to utilize unused switch plane channels 29 such that entire switch planes 23 can be eliminated, thus substantially reducing the cost of implementing the system. FIG. 6 contains allocation tables for the implementation of FIG. 5.

Figure 7:
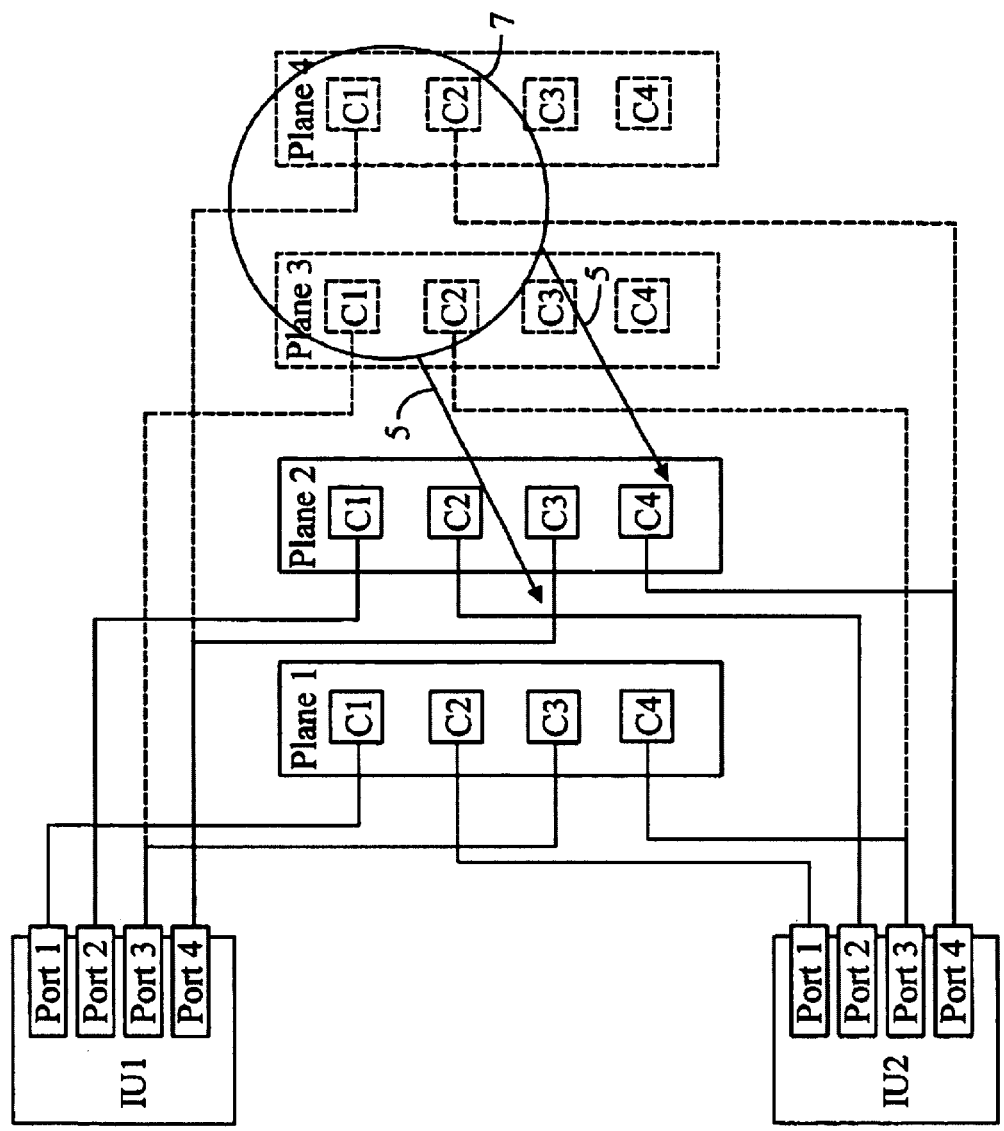
FIG. 7 contains a schematic diagram of switching channel reallocation of the system of FIG. 5 in accordance with one embodiment of the present invention.

FIG. 7 is a schematic block diagram which illustrates one embodiment of the reallocation process of the invention in which unused channels 29 are used to implement connections previously assigned to other channels on other switch planes 23. Specifically, as schematically illustrated by circle 7 and arrows 5, the connections previously assigned to Channels 1 and 2 of Plane 3 are moved to Channels 3 and 4 of Plane 1. Likewise, the connections previously allocated to Channels 1 and 2 of Plane 4 are moved to Channels 3 and 4 of Plane 2. As a result of this reallocation, Planes 3 and 4 become completely unused and therefore need not be implemented. This switching fabric scaling or "fabric folding" results in an efficient implementation of the switching fabric which allows substantial, e.g., one-half, reduction in hardware implementation complexity and cost.

Figure 8:
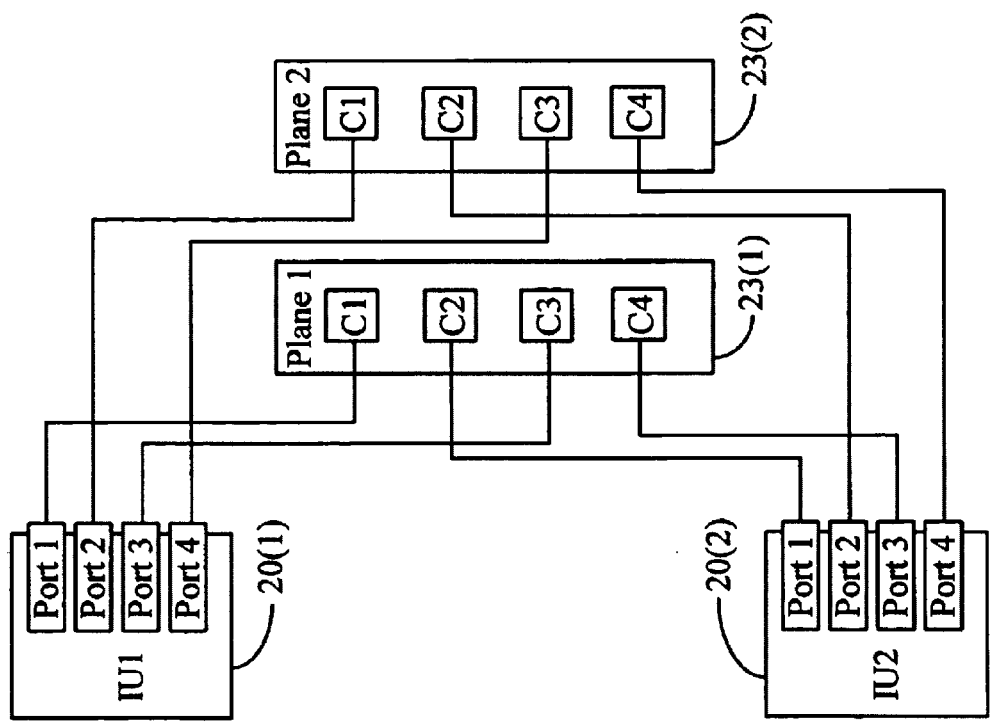
FIG. 8 contains a schematic block diagram of switching channel and interface unit port assignments reallocated in accordance with one embodiment of the present invention.

FIG. 8 is a schematic block diagram which illustrates the results of the reallocation shown in FIG.7. As shown, the two interface units 20(1), 20(2) are fully connected across only two switch planes 23(1), 23(2), as opposed to the four switch planes utilized before the reallocation process of the invention. As shown in FIG. 8, each port of both interface units can communicate with both interface units within a single switch plane 23. Therefore, even though half of the switching hardware is used to implement system, there is no reduction in data transfer bandwidth.

In accordance with the invention, in addition to making the reallocated port/switch hardware connections shown in FIG. 8, new allocation tables are generated for each port FIG. 9 contains the allocation tables for the reallocated switching circuitry of FIG. 8. As illustrated by the tables of FIG. 9 and the schematic depiction of FIG. 7 of the reallocation process, for the ports that are reallocated to the unused channels of switch Planes 1 and 2, the allocation tables are altered. That is, the allocation tables for Ports 3 and 4 of both IU1 and IU2 are changed to identify the new remapped channels, i.e., the formerly unused channels, of Planes 1 and 2.

Thus, in accordance with the invention, a scalable switching fabric is achieved in which inefficiencies associated with under-utilization of switching capabilities can be substantially reduced. As described above, where fewer interface units are connected to the switch fabric, the switching circuitry can be reallocated to utilize unused switching channels. This is accomplished by physically routing switch connections from the IU ports to the switch channels in accordance with the reallocation. In addition, allocation tables associated with each port are updated such that data packets are properly routed through the switch fabric.

Not only can the switching fabric be scaled down or "folded" as described above, but the fabric can also be scaled back up or "unfolded" as desired. While operating in a scaled down or folded configuration, it may be desirable to add additional interface units to the switch fabric to expand the capabilities of the system. In this case, the folded fabric can be unfolded by making new connections as desired between the IU ports and the switching channels. In addition, new allocation tables can be produced to accommodate the unfolding or scale-up process. Hence, an extremely flexible scalable switch fabric is provided which can accommodate many changes to the degree to which the switching capabilities are utilized. In unfolding, it may also be necessary to add one or more switch planes back into the fabric.

The foregoing describes in detail the reallocation method and apparatus of the invention in terms of a system using four interface units each having four ports and a switching fabric having four switch planes of four switch channels each. It will be understood that the features of the invention are applicable to a switching circuitry having any number of switch planes of any number of switching channels each being connected to any number of interface units. For example, the invention is applicable to one embodiment in which a full implementation includes sixteen interface units of twelve ports each connected to twelve switch planes of sixteen switching channels each.

In accordance with the invention, the switch fabric can be scaled or "folded" to a number of possible configurations to eliminate switch planes, depending upon various factors, including the number of interface units implemented. FIGS. 10–14 are schematic illustrations of various fabric folding configurations in accordance with the invention. These examples are applied to the system in which each interface unit includes twelve ports implemented on two fabric interface (FI) cards of six ports each. In one particular embodiment, only five of the six ports on each FI card are implemented. These examples also illustrate switching planes or "slices" having sixteen switching channels each for connecting to up to sixteen interface units. As described above, when fewer than sixteen IUs are implemented, the excess switching channels of the switch planes are normally unused, in the absence of the reallocation of the present invention. In the case of a normal system with K interface units, channel numbers K+1 through 16 will be unused on each fabric plane. In accordance with the fabric folding approach of the invention, the otherwise unused ports are used to emulate additional switch fabric planes.

In a preferred system, like numbered fabric ports for the various interface units should be connected to the same fabric plane. For example, Port 1 in each interface unit should be connected to the same fabric plane, e.g., Plane 1. This particular fabric plane, however, may also connect to other ports. Because of this constraint, there is in one embodiment a geometric ordering of the fabric folding technique. Each fabric folding configuration can be classified or characterized as K:1, where K represents the number of times that each fabric plane is reused to represent another virtual fabric plane. Thus, in a 5:1 folded fabric, five channels are used in a plane for one interface unit.

Figure 10:
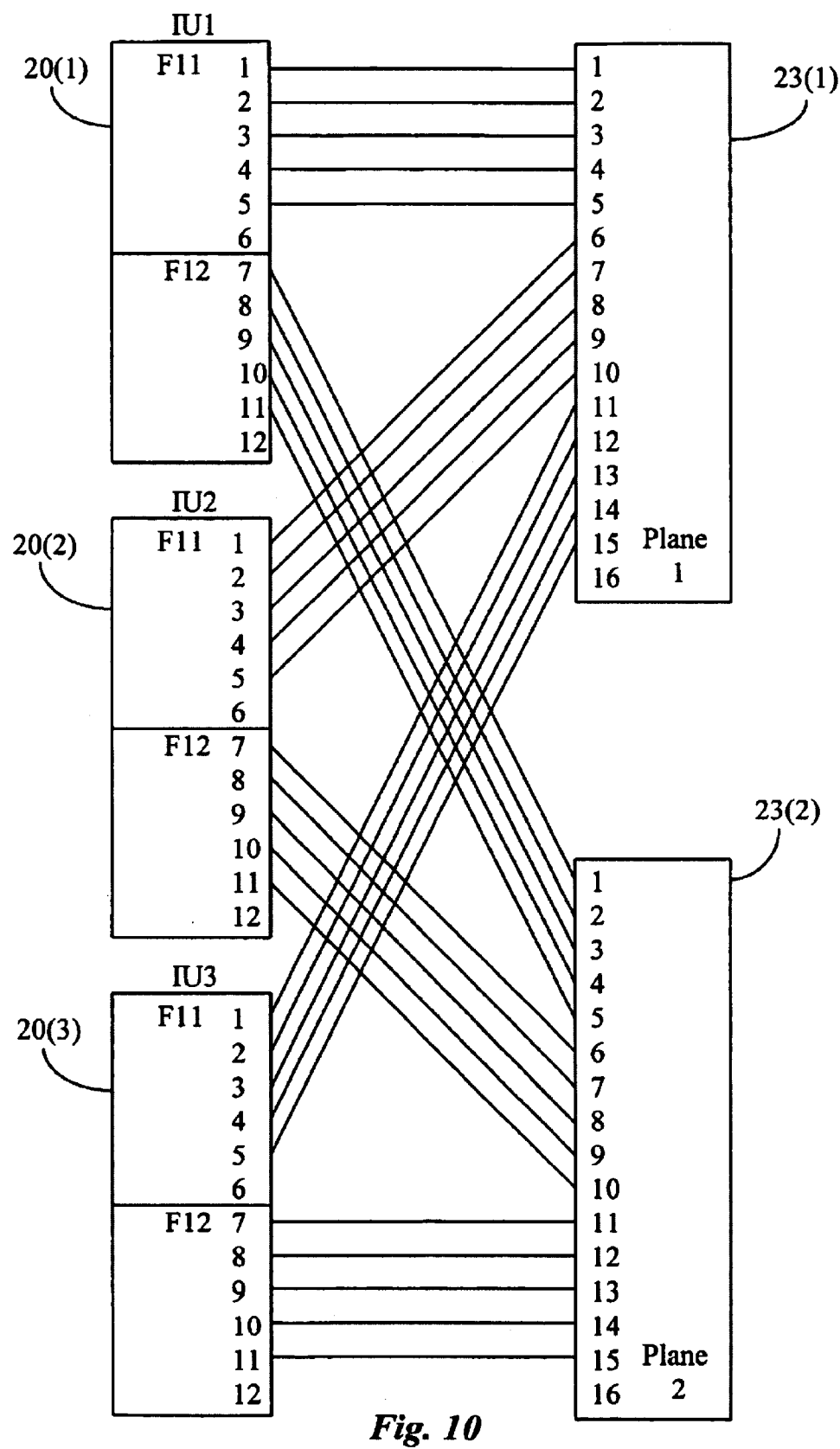
FIGS. 10–14 are examples of folded configuration in an embodiment of the present invention.

The examples of folded fabrics shown in FIGS. 10–14 will now be described in detail. It is noted that a single interface unit does not require any fabric planes because it is possible to loop back the port interfaces upon themselves. However, once two interface units are used, folded fabric configurations can be introduced. For example, with two interface units, the 5:1 folded fabric configuration of FIG. 10 can be used. This configuration utilizes each fabric plane to emulate five virtual fabric planes. With this configuration, two to three interface units can be supported. To support this level of folding, this configuration only uses the minimum of five fabric ports on each FI card required to maintain full traffic bandwidth. There are not enough channels on the two switch fabric planes to support six fabric ports on each fabric interface card. With five ports in use however there is one spare channel on each fabric plane that can be utilized during a fabric upgrade while avoiding bandwidth degradation during the upgrade. In FIG. 10 the illustrated port pairings are chosen to represent the easiest visualization of the interconnections. As with other folded fabric configurations, many other port pairings are possible. Eventual port pairings should be chosen to minimize the cable migrations required between the eventual supported folded fabric configurations.

Figure 11:
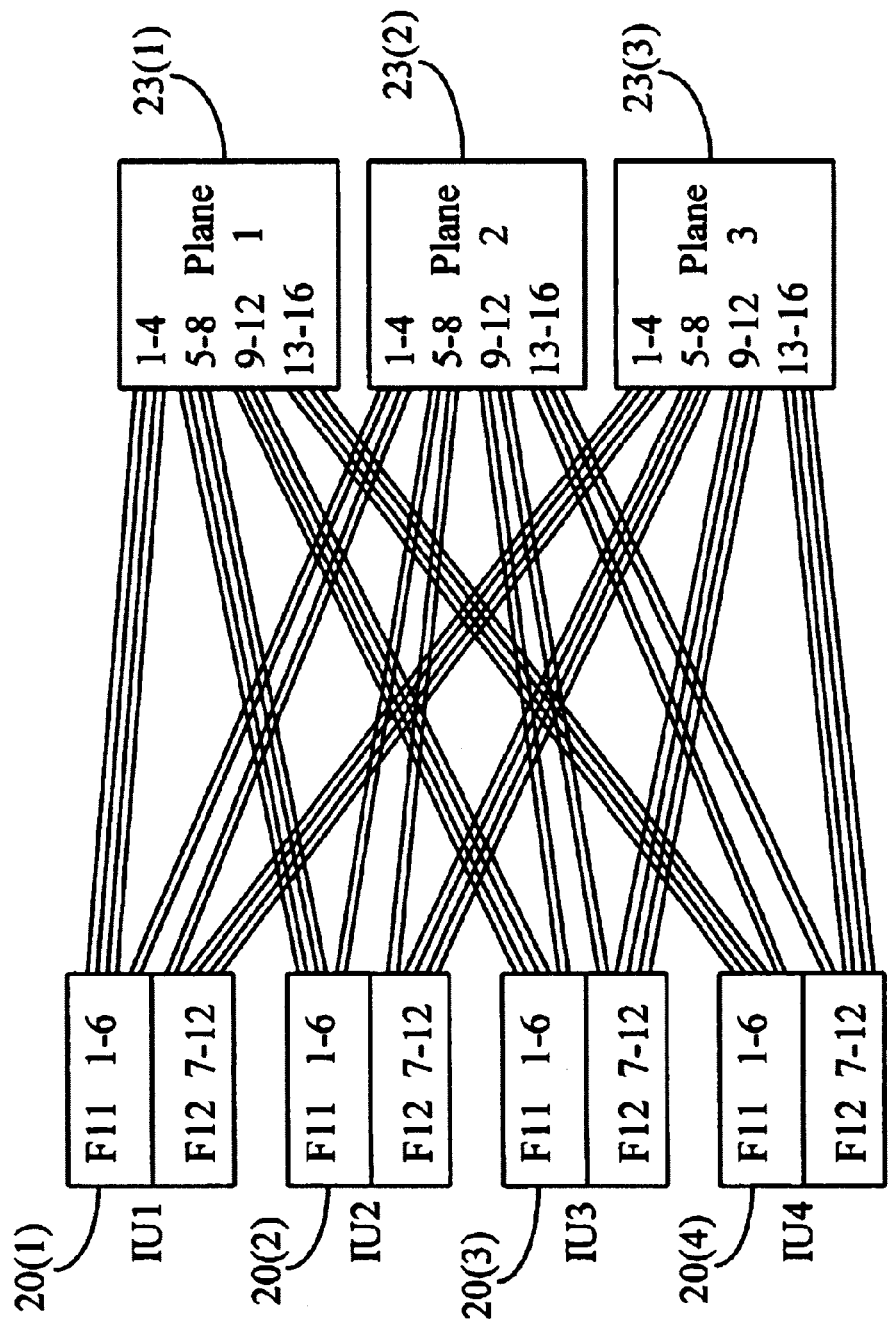

FIG. 11 schematically illustrates a 4:1 folded fabric configuration. This configuration uses three fabric planes, but is only capable of supporting one additional interface unit over the 5:1 configuration. Once again, the fabric port pairings shown in FIG. 11 are one of many possible pairings.

Figure 12:
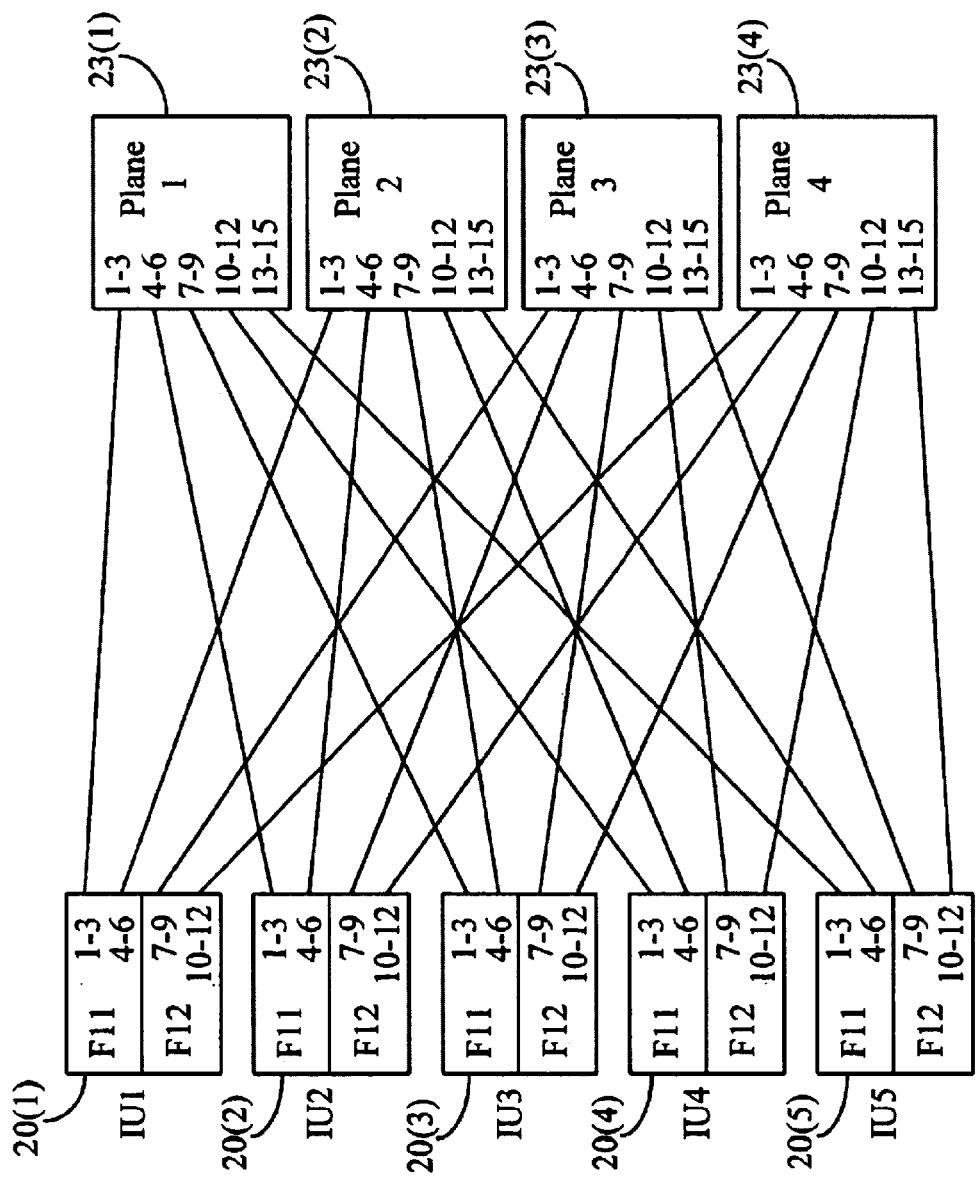

FIG. 12 illustrates a 3:1 folded fabric configuration, which adds another fabric plane to the system, but again only allows a single additional interface unit over the 4:1 configuration. Utilizing a total of four fabric planes, this configuration supports five interface units.

Figure 13:
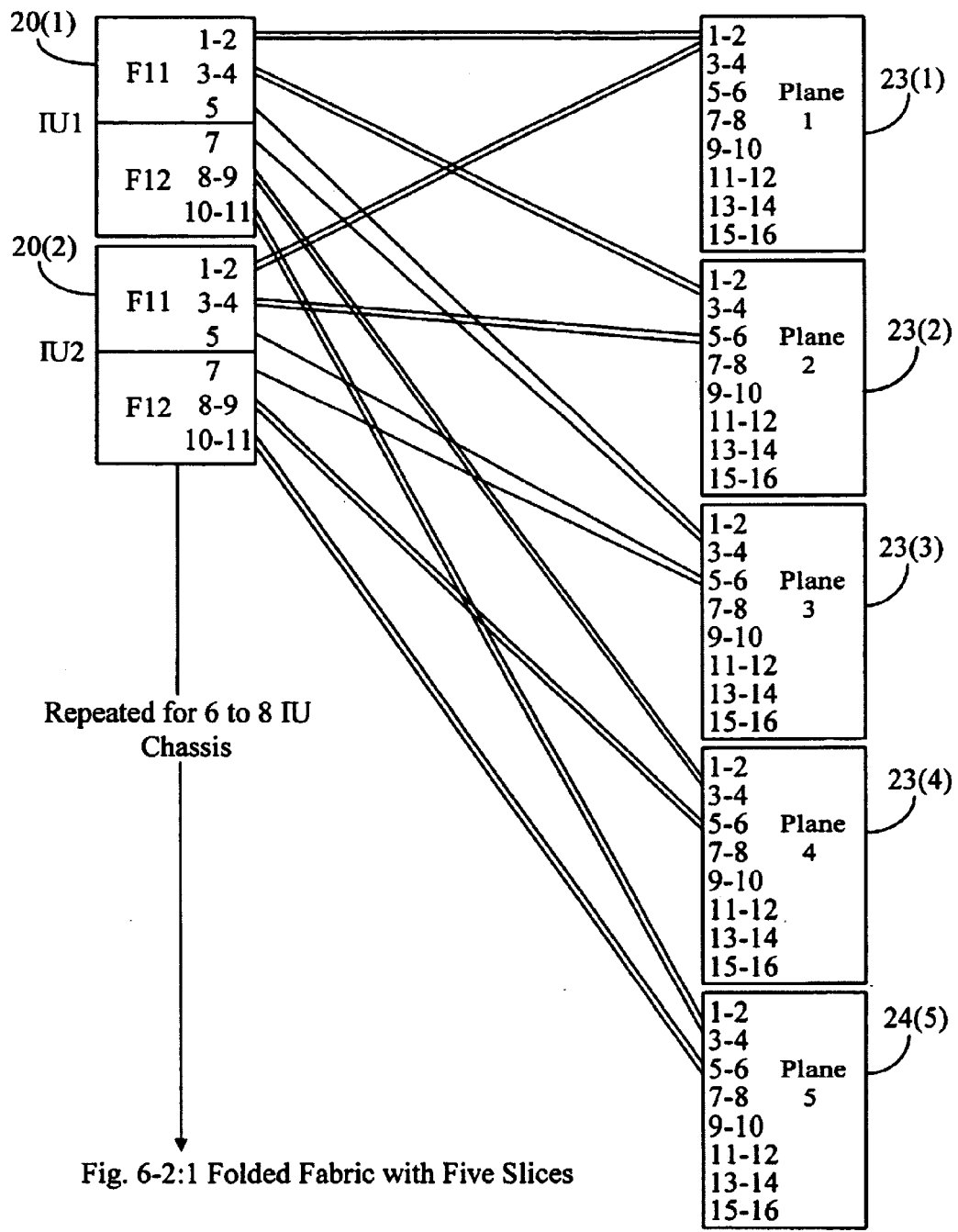

FIG. 13 illustrates a 2:1 folded fabric. There are actually two different configurations of 2:1 folding depending on whether five or six fabric ports on the FI cards are supported. The 2:1 folding means that two different port numbers on each FI card utilize the same fabric plane. Five fabric planes are required to support the minimum five fabric ports on each FI card. A sixth fabric plane allows support of the sixth fabric port.

Figure 14:
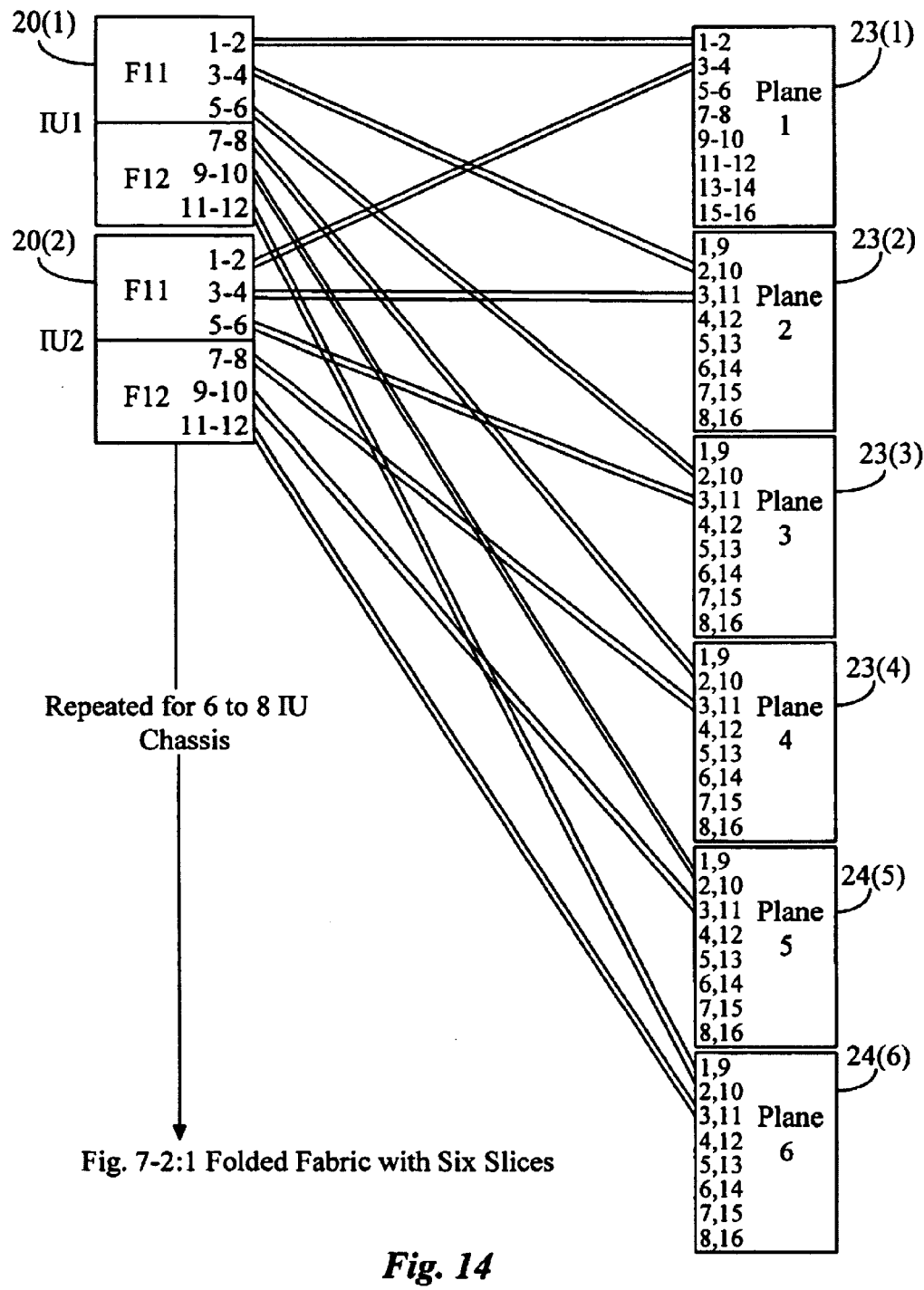

This fabric configuration is valid for up to eight interface units. The detailed interconnections for five fabric planes are illustrated in FIG. 13. FIG. 14 illustrates the 2:1 folded fabric configuration using six fabric planes. It should be noted that in FIGS. 13 and 14, for clarity of the illustrations, the connections for six to eight interface units are omitted.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method for reallocating switching circuitry in a switching fabric to permit data transfer among a plurality of interface units each having a plurality of data ports, the switching fabric being partitionable into a plurality of switch planes such that each switch plane is assignable to transfer data associated with a data port of the plurality of interface units and each switch plane including multiple switching data communication links each being assignable to transfer data associated with one data port of one of the interface units, the method comprising:

- determining a number of interface units including the plurality of data ports connected to the switching fabric;
- determining a number of switching data communication links in each switching plane; and
- if the number of interface units is less than the number of switching data communication links in each switch plane, for at least one of the plurality of switch planes, assigning a first data communication link in the switch plane to transfer data associated with a first data port of a first interface unit and assigning a second data communication link in the switch plane to transfer data associated with a second data port of the first interface unit;
- characterized in that switching channels in the switch plane are assigned to data ports via an allocation table stored in a memory, wherein the allocation table defines a relationship between data ports and data communication links.

2. The method of claim 1, wherein each interface unit comprises twelve data ports.

3. The method of claim 1, wherein each switch plane comprises sixteen switching data communication links.

4. The method of claim 1, wherein switching circuitry is reallocated such that the number of switch planes in the switching fabric can be reduced.

5. The method of claim 1, wherein the switching circuitry is reallocated such that the number of switch planes in the switching fabric can be reduced by one half.

6. The method of claim 1, wherein the switching circuitry is reallocated by updating the allocation table.

7. An apparatus for reallocating switching circuitry in a switching fabric to permit data transfer among a plurality of interface units each having a plurality of data ports, the switching fabric being partitionable into a plurality of switch planes such that each switch plane is assignable to transfer data associated with a data port of the plurality of interface units and each switch plane including multiple switching data communication links each being assignable to transfer data associated with one data port of one of the interface units, the apparatus comprising:

- a memory for storing an allocated table that stores assignments of the switching data communication links to data ports of the interface units; and
- a processor for (i) determining a number of interface units connected to the switching fabric, (ii) determining a number of switching data communication links in each switch plane, and (iii) if the number of interface units is less than the number of switching data communication links in each switch plane, for at least one of the plurality of switch planes, assigning a first data communication link in the switch plane to transfer data associated with a first data port of a first interface unit and assigning a second data communication link in the switch plane to transfer data associated with a second data port of the first interface unit;
- characterized in that switching channels in the switch plane are assigned to data ports via an allocated table stored in a memory, wherein the allocation table defines a relationship between data ports and data communication links.

8. The apparatus of claim 7 wherein the processor updates the allocation table to include new assignments of switching data communication links to data ports of the interface units.

9. The method of claim 7, wherein each interface unit comprises twelve data ports.

10. The method of claim 7, wherein each switch plane comprises sixteen switching data communication links.

11. The apparatus of claim 7, wherein switching circuitry is reallocated such that the number of switching planes in the switching fabric can be reduced.

12. The apparatus of claim 7, wherein the switching circuitry is reallocated such that the number of switch planes in the switching fabric can be reduced by one half.

13. The apparatus of claim 7, wherein the switching circuitry is reallocated by updating the allocation table.

* * * * *